Sept. 17, 1935.  A. H. LAMB  2,014,386
SENSITIVE CONTROL DEVICE
Filed Sept. 8, 1933  4 Sheets-Sheet 1
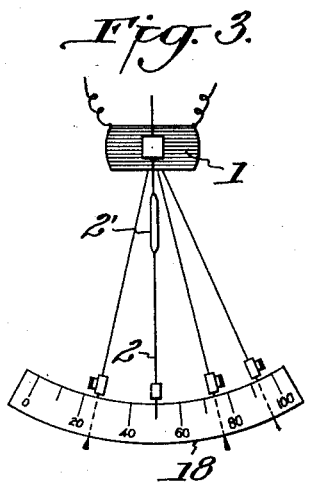
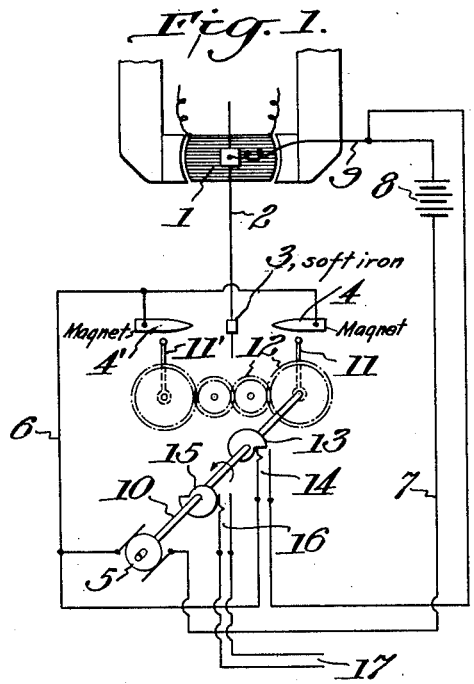
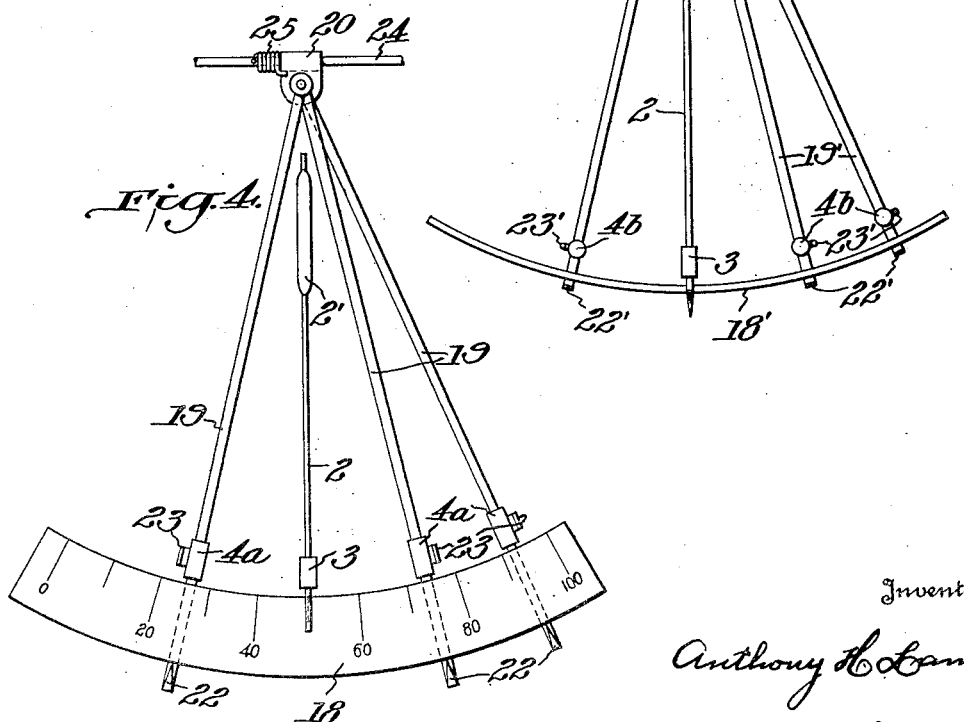
Inventor:
Anthony H. Lamb,
By Potter, Pierce & Scheffler,
Attorneys.

Sept. 17, 1935. A. H. LAMB 2,014,386
SENSITIVE CONTROL DEVICE
Filed Sept. 8, 1933 4 Sheets-Sheet 2
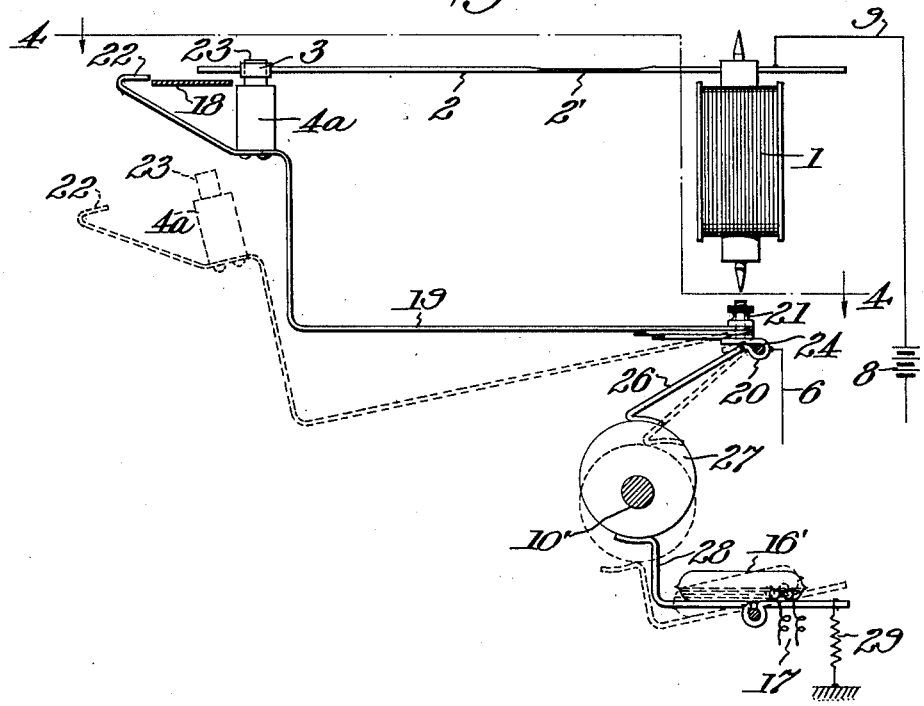
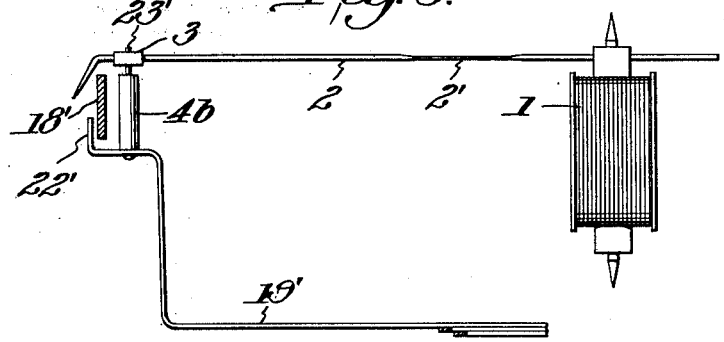
Inventor:
Anthony H Lamb,
By Potter, Pierce & Scheffler,
Attorneys.

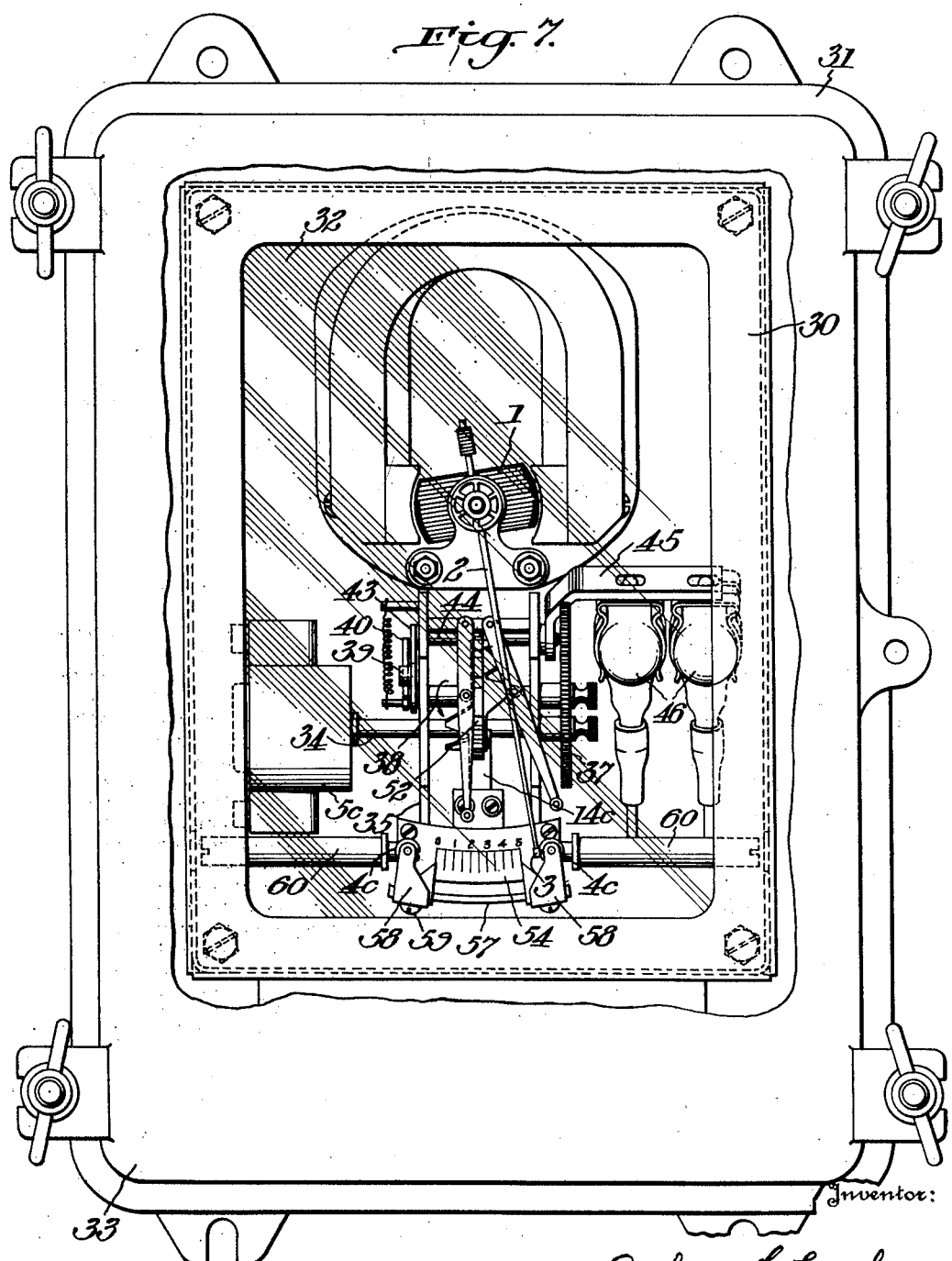

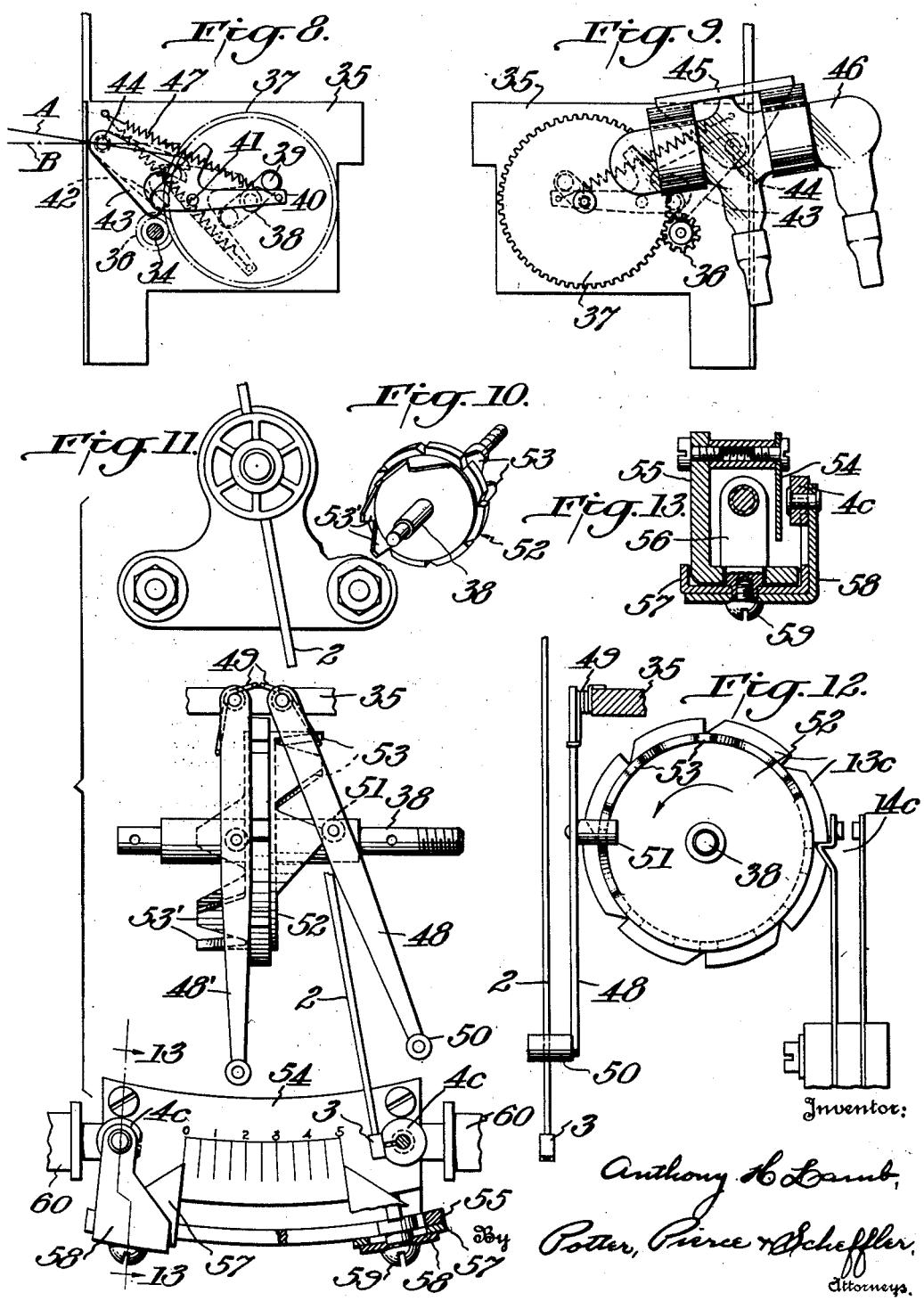

Patented Sept. 17, 1935

2,014,386

UNITED STATES PATENT OFFICE 2,014,386

SENSITIVE CONTROL DEVICE

Anthony H. Lamb, Elizabeth, N. J., assignor to Weston Electrical Instrument Corporation, Newark, N. J., a corporation of New Jersey Application September 8, 1933, Serial No. 688,695

30 Claims. (Cl. 175—320)

This invention relates to sensitive control devices and particularly to instrument type relays for controlling an electrical circuit or circuits in accordance with variations of a factor measured by the instrument.

In my copending application, Ser. No. 688,696 filed September 8, 1933, I have described and claimed control devices including an instrument or measuring device having a pointer which carries a magnetic rider for cooperation with a fixed or relatively fixed magnet to obtain a reliable electrical contact, and manually operated or automatic mechanism for resetting the instrument after a contact is established. The present invention contemplates the same general type of construction and method of operation.

An object of the present invention is to provide a control device including an instrument, magnetic elements for insuring a firm and reliable closure of the instrument contacts, and motor operated mechanism controlled by the instrument contacts for thereafter opening the instrument contacts and controlling a switch or switches in a load circuit. A further object is to provide a control device of the type stated, and in which the motor operated mechanism includes elements for determining the sequence and/or the minimum timing of the instrument closures which result in an actuation of a switch in the controlled or load circuit. More particularly, an object is to provide a control device including an instrument having a contact arm movable between two contacts to close a circuit or pair of circuits, magnetic elements for insuring a firm closure of the instrument contacts, a switch in a controlled or load circuit, and a motor and associated elements for actuating the switch to open or closed position only after a predetermined number of engagements of the contact arm with the appropriate contact.

These and other objects and advantages of the invention will be apparent from the following specification when taken with the accompanying drawings in which:

Fig. 1 is a somewhat schematic view of an embodiment of the invention in which the instrument is an electrical measuring instrument having a contact arm or pointer movable between two contacts;

Fig. 2 is a diagrammatic side elevation of an embodiment of the invention in which the instrument pointer or contact arm is movable over a wide angle scale for engagement with one or more contacts that are located at predetermined points along the scale;

Fig. 3 is a plan view of the control device shown in Fig. 2;

Fig. 4 is a sectional view as taken on line 4—4 of Fig. 2;

Fig. 5 is a fragmentary side elevation of a device such as shown in Fig. 2, but in which the instrument has a vertical scale;

Fig. 6 is a fragmentary plan view of the same;

Fig. 7 is a front elevation of a control device in which the load circuit is opened, or closed, only after a predetermined number of closures of the instrument contacts; a part of the front wall of the casing being broken away for the better illustration of the apparatus;

Figs. 8 and 9 are fragmentary side elevations, from opposite sides of the device, of the mechanism for actuating the switch or switches in the load circuit;

Fig. 10 is a perspective view of the cam for operating the pusher arms that separate the magnetic contact elements;

Fig. 11 is an enlarged fragmentary front elevation of the contact elements, the associated scale and indexes, the cam and one pusher arm;

Fig. 12 is an enlarged and fragmentary side elevation of the contact arm, a pusher arm, the cam and the auxiliary motor switch; and Fig. 13 is an enlarged sectional view on line 13—13 of Fig. 11.

In the drawings, the measuring instrument or primary control device is shown as an electrical measuring instrument having a moving coil 1 carrying a pointer or contact arm 2 on which a rider 3 of soft iron or other magnetic material is mounted for cooperation with relatively fixed contacts 4, 4'. The contacts 4, 4' are small magnets having poles which are rounded or pointed, and preferably both the rider 3 and the tips of the contacts are coated or plated with a metal of good electrical conductivity, such as gold or silver. When the value of the factor measured by the instrument is such that the pointer 2 brings the magnetic rider 3 within the field of one of the magnets 4, 4', the rider is drawn into firm engagement with the magnet to establish a reliable electrical contact.

As illustrated, both contacts 4, 4' are connected to one terminal of a motor 5 by a lead 6, and the opposite motor terminal is connected by lead 7 to a current source 8, indicated diagrammatically as a battery, the circuit being completed by a lead 9 from the current source to the contact arm 2 of the instrument. The motor shaft 10 carries a pusher arm 11 for forcing the contact arm 2 towards the left to separate the rider 3 from the magnet 4 when the engagement of the contacts 3, 4 energizes the motor 5 through the described circuit, and a similar pusher arm 11' is mounted adjacent magnet 4' and driven simultaneously with pusher arm 11 through a gear train 12. The motor shaft 10 also carries a cam 13 for closing an auxiliary motor switch 14 which completes a motor circuit in parallel with that through instrument contacts 3, 4 or 3, 4' before the instrument contacts are opened by the pusher arms, the shape of the cam being such that the motor completes one revolution before the auxiliary switch is opened to stop the motor.

A cam 15 on the motor shaft actuates a switch 16 in the controlled or load circuit 17, and the cam surface may be designed to actuate the switch 16 at a predetermined point in the single revolution of shaft 10 which is required to reset the instrument.

It will be apparent that the described construction may be employed to actuate a visual or audible signal in the load circuit when the factor measured by the instrument falls to a predetermined lower limit or rises to a predetermined upper limit or, in accordance with known designs, the load circuit 17 may include regulating elements for counteracting the changes which resulted in the measured variation of the controlling factor.

As shown in Figs. 2 to 4, inclusive, the invention is also applicable to instruments having wide angle scales. The moving system 1 of the measuring instrument includes a pointer 2 which has a tip movable over the arcuate scale 18, the magnetic rider 3 being positioned on the pointer just short of the scale. A portion 2' of the pointer is preferably flattened to afford a minimum resistance to deflection of the pointer when the rider 3 is approximately alined with one of the magnets 4a. The magnets 4a are carried on radial arms 19 which are pivoted upon a support 20 that is mounted approximately in axial alinement with the axis of the moving system 1, the arm being angularly adjustable on the support and retained in desired adjustment by a suitable clamp, such as the nut 21. The arms 19 extend beyond the scale 18 and terminate in reversely bent tips 22 that normally lie in the plane of the scale 18 to serve as indexes to indicate the setting of the several magnets 4a. Any desired number of magnets 4a may be provided for location at desired points along the scale, and each magnet carries a stop 23 for preventing an overswing of the pointer in the event that the value of the measured factor changes rapidly.

The support 20 is journalled on a shaft 24 and is yieldingly pressed in counterclockwise direction, as viewed in Fig. 2, by a spring 25. The support 20 and arms 19 are normally retained in the full line position shown in Fig. 2 by an arm 26 on the support which bears upon a cam 27. The cam 27 is mounted on the shaft 10' of a motor, not shown, which is included in circuits such as shown in Fig. 1. The switch 16' in the load circuit 17 may be mounted on a pivoted arm 28 which is pressed against the cam 27 by a spring 29.

When the magnetic rider 3 moves into alinement with a magnet 4a, the rider is drawn to the magnet to energize the motor, and shaft 10' is thereby rotated to carry the eccentric cam 27 into the position shown in dotted line in Fig. 2. During this movement of the cam, the spring 25 rotates the support 20 to depress the radial arms 19, thus breaking the instrument contact since the scale 18 acts as a stop to prevent the pointer 2 from following the downward movement of the magnets 4a. The rotation of the cam 27 actuates the switch 16' and also an auxiliary motor switch, not shown, which energizes the motor upon the opening of the instrument contacts.

As shown in Figs. 5 and 6, the instrument scale 18' may be of the vertical type and, except for slight changes in the form of the radial arms 19' and their index tips 22', the construction may be substantially the same as that illustrated in Figs. 2 to 4, inclusive. The magnets 4b are shown as of cylindrical form with attached cylindrical stops 23', but the flattened form shown in Figs. 2 to 4 may, if desired, be employed as the exact form of the magnets may be varied to meet different design conditions. The resetting mechanism is not illustrated but may be of the form previously described, the scale 18' again serving as a stop to prevent the pointer 2 from partaking of the downward movement of the arms 19' and magnets 4b.

In the commercial form of the invention which is shown in Figs. 7 to 13, inclusive, the apparatus is mounted in a dustproof housing 30 within an outer casing 31, the housing having a glass coverplate 32 and, if desired, the casing door 33 being provided with a similar sight opening. The primary control instrument comprises a sensitive electrical measuring instrument having a moving coil 1 carrying a pointer 2 on which a soft iron rider 3 is mounted. As in the arrangement shown in Fig. 1, the pointer 2 is movable between a pair of magnets 4c and the rider 3 engages one of these magnets to complete an energizing circuit to an electric motor 5c when the factor measured by the instrument reaches either of two limiting values.

The motor shaft 34 is journalled in a frame 35 and carries a gear 36 which meshes with a gear 37 on a cam shaft 38 which is also mounted in the frame 34. One end of the cam shaft carries a crank arm 39 for rocking the curved lever 40 in opposite directions, the lever being pivoted on the frame at 41 and carrying a pin 42 which rocks the bifurcated arm 43 in opposite directions. The arm 43 is secured to the rocking shaft 44 which carries a frame 45 upon which a plurality of mercury tilt switches 46 are mounted. The switches 46 are included in the controlled or load circuit and, as illustrated in Fig. 9, both switches are open and will remain open until the clockwise rotation of the crankarm 39, see Fig. 8, forces the lever 40 into the dotted line position to tilt the arm 43 upwardly. This movement of the arm 43 carries the mounting plate 45 from the inclined position indicated by line A of Fig. 8 into the position indicated by the broken line B, thus tilting the mercury switches 46 to close circuits between their respective contacts. A snap action is obtained by the spring 47 which is secured to the frame 35 and to an end of the lever 40.

As best shown in Figs. 11 and 12, a pair of pusher arms 48, 48' are pivotally mounted on the frame 35 and are urged towards each other by coil springs 49, the ends of the arms carrying small cylinders 50, for engagement with the pointer 2. Each pusher arm has a pin 51 which is held in engagement with a cam track on the cam 52 by the coil springs. The cam track for pusher arm 48 includes four angular lobes 53 which occupy 180° of the circumference of the cam, and the track for the arm 48' includes four similar lobes 53' which are displaced by 180° from the lobes 53. Starting with the parts in the position illustrated in Figs. 7 and 11, it is apparent that the pusher arm 48 will make four excursions to the right during the next 180° movement of the cam 52 and will then remain at its extreme lefthand position during the succeeding 180° movement. During this second half revolution of the cam, the pusher arm 48' will first move to its outer position and then make four excursions to the right, returning to its illustrated position when the cam has completed one full revolution.

The central portion of the cam 52 is provided with eight lobes 13c (corresponding to cam 13 of Fig. 1) for closing the auxiliary motor switch 14c before the movement of a pusher arm 48, 48' opens the instrument contact by forcing the pointer 2 and rider 3 away from a magnet 4c.

As best shown in Figs. 11 and 13, the instrument scale 54 is carried by a curved angle bar 55 which has its lower flange slotted to receive the posts 56 to which the index members 57 and magnet supports 58 are secured by a screw 59. The index members 57 terminate in points which are so spaced from the magnets 4c as to indicate the outer limit of the magnetic field of the respective magnets at which the field strength is sufficient to draw the rider 3 to the magnet. As shown at the right of Fig. 11, the index member 27 is slotted to permit relative movements of the members 57, 58 to calibrate the location of the index 57 for a particular circular magnet 4c. When the index member 57 is properly adjusted with respect to its associated magnet support 58, the assembly may be moved along the scale 54 by the adjusting sleeves 60 which are accessible through openings in the inner housing 30 and carry screws 61 that are threaded into the posts 56 of the index-magnet support units.

The operation of the control device is as follows. By reference to Fig. 1, it will be apparent that a complete revolution of the cam shaft 38 corresponds to four engagements of the pointer 2 and its rider 3 with the righthand magnet 4c and thereafter to four engagements of the rider 3 with the lefthand magnet 4c. With the parts in the positions illustrated, the measured value of the factor has reached its upper predetermined limit and the motor circuit is completed by the instrument contacts, the switches 46 of the load circuit being open. The rotation of the motor shaft 34 results in a movement of pusher arm 48 to the left, thus breaking the instrument contact, but the closure of the auxiliary switch 14' ensures an energization of the motor 5c until the cam 52 has rotated through 45 degrees. This one-eighth revolution returns the pusher arm 48 to its original position and, if the measured factor still has its upper limiting value, the instrument contacts again close and another one-eighth revolution of the cam shaft results. The minimum timing of four consecutive closures of the instrument contacts is determined by the motor speed and the ratio of the gears 36, 37. To permit a ready changing of this timing, the gears 36, 37 are preferably removable and may be replaced by another pair of gears. During the half revolution of the cam shaft corresponding to four successive engagements of rider 3 with the righthand magnet 4c, it is not possible for the rider 3 to engage the other magnet since the pusher arm 48' remains at its extreme right position and prevents such engagement. Upon four consecutive closures of contacts corresponding to predetermined maximum values of the measured factors, the cam shaft rotates 180° and the crank arm 39 rocks the lever 40 to throw the tilt switches 46 to their alternative position. The pusher arm 48 then remains at its inner position and prevents movement of the pointer 2 to the right. The next four operations of the motor must therefore be effected by four successive movements of the pointer 2 to the other limit of its range of movement.

The described control apparatus is useful when the factor measured by the primary control instrument is subject to minor fluctuations which would produce undesirable intermittent changes in the load circuit connections if the load circuit switches were actuated each time that the factor momentarily reached one of its predetermined limiting values. For example, in the control of illumination, it is not desirable to complete a light circuit when the illumination first drops to a predetermined lower level since the illumination does not decrease progressively at nightfall. With the described construction, the light circuit will not be completed until the illumination falls at least four times to a lower critical value, or remains at or below that value for a predetermined period, and the light circuit will not be opened unless the illumination rises to a predetermined value at least four times or remains above that value for a predetermined period.

It will be apparent that the minimum timing of the required consecutive instrument closures may be varied by a choice of the ratio of gears 36, 37, and that the invention is not restricted to the use of any particular number of consecutive engagements of the instrument contacts. Appropriate design of the cam tracks of cam 52 permits an actuation of the load circuit switches upon a predetermined number (which may be one) of engagements of the instrument contacts. The full advantages of the invention are attained when the instrument is a sensitive measuring device that is not capable of developing a force sufficient to establish a reliable engagement of the instrument contacts but the motor actuated system for controlling the minimum timing and/or sequence of closures of a plurality of instrument contacts may be used with primary control instruments which do not require the magnetic elements to secure good contacts. The invention is useful with any type of primary instrument having moving systems for engaging a contact arm with one or a plurality of relatively fixed contacts in accordance with variations in a factor which determines the operation of the moving system.

In the following claims, the term "motor" is employed to designate apparatus, such as the synchronous motors used in time clocks and the like, which includes a field structure and a rotating armature.

I claim:

1. In a control device, the combination with an instrument including a moving system, a pointer carried by the moving system and having a contact thereon, and a relatively fixed contact, of a pusher movable into the path of said pointer for separating said contacts, a motor having an energizing circuit including said contacts, whereby said motor is energized when said contacts are closed, means actuated by said motor to move said pusher to separate said contacts, a switch adapted to be included in an auxiliary circuit for energizing said motor, and means actuated by said motor for closing said switch prior to the opening of said contacts by said pusher and for opening said switch when said motor has returned said pusher to a position outside the path of movement of said pointer.

2. The invention as set forth in claim 1, wherein the contact on said pointer comprises a rider of magnetic material, and said relatively fixed contact is a magnet.

3. In a control device, an instrument including a moving system having a pointer carrying a rider of magnetic material, a magnet cooperating with said rider to form a pair of instrument contacts, a pusher arm movable to separate said rider from said magnet, a motor having an energizing circuit including said instrument contacts, means actuated by said motor for moving said pusher arm to effect the said separation, a load circuit switch, and means driven by said motor for actuating said switch once for a predetermined number of movements of said pusher arm.

4. In a control device, the combination with an instrument including a relatively fixed contact and a movable pointer carrying a contact, and a load circuit switch, of means for actuating said switch once for a predetermined number of closures of said contacts; said means comprising a pusher arm adapted to force one of said contacts away from the other, a cam for imparting an oscillatory motion to said pusher arm, said cam having a plurality of lobes each adapted to complete one cycle of movement of said pusher arm, a motor for rotating said cam, means including said instrument contacts and operative upon a closure thereof to energize said motor for a period producing an angualr advance of but one lobe of said cam, whereby said contacts are opened and held open by said pusher arm for a predetermined period upon each closure thereof, switch operating means having two alternative positions corresponding respectively to the open and the closed position of said load circuit switch, and means driven by said motor during a plurality of successive energizations thereof for moving said switch operating means from one alternative position to the other.

5. In a control device, the combination with an instrument having a pointer carrying a contact and movable between two relatively fixed contacts, of a pair of pusher arms for engaging said pointer to separate the contact thereon from the respective fixed contacts, a motor having an energizing circuit including said pointer contact and alternatively one or the other of said fixed contacts, cam means actuated by said motor for moving at least one of said pusher arms from an inactive position thereof to effect a separation of the contacts whose engagement completed the energizing circuit of said motor, an auxiliary circuit including a switch actuated by said motor for continuing the energization thereof until said cam means restores the actuated pusher arm to its inactive position, and a load circuit switch actuated by said motor.

6. A control device as claimed in claim 5, wherein said pointer contact is a rider of magnetic material, and each of said fixed contacts is a magnet.

7. A control device comprising a measuring instrument having a contact arm movable to engage either one of a pair of spaced and relatively fixed contacts, a pair of pusher arms for separating said contact arm from engagement with the respective spaced contacts, and means for simultaneously actuating both of said pusher arms.

8. A control device as claimed in claim 7, wherein magnetic means is provided for establishing a firm contact engagement between said contact arm and the respective fixed contacts when said contact arm is moved into a predetermined proximity to one or the other of said fixed contacts.

9. A control device as claimed in claim 7, wherein said means for actuating said pusher arms is an electrically-actuated device, and the energizing circuit of said device includes said contact arm and one of said fixed contacts.

10. A control device comprising an instrument having a pointer movable between a pair of magnetized contacts, a contact of magnetic material on said pointer, a motor having an energizing circuit controlled by said instrument contacts, means actuated by said motor for separating those instrument contacts whose engagement completed the said energizing circuit, a load circuit switch, and means actuated by said motor for operating said switch.

11. A control device as claimed in claim 10, wherein said means for separating said contacts includes means preventing the engagement of said pointer contact with one of said pair of contacts until said pointer has first engaged the other contact a predetermined number of times.

12. A control device comprising an instrument having a moving system including a contact of magnetic material, a magnet serving as a relatively fixed contact, a motor having an energizing circuit including the said contacts, means actuated by said motor for separating said contacts after the engagement thereof has energized said motor, a load circuit switch, and switch operating means actuated by said motor for operating said switch once for a predetermined number of engagements of said instrument contacts.

13. A control device comprising an instrument having a movable system including a contact of magnetic material, a magnet serving as a relatively fixed contact, whereby said magnetic contact is drawn to said magnet when said moving system occupies a predetermined position, a pusher arm for separating said contacts, a motor energized upon engagement of said contacts for moving said pusher arm to separate the same, means including a motor operated switch for continuing the energization of said motor for a predetermined period following the separation of said contacts, and a load circuit switch actuated by said motor.

14. A control device comprising a moving system having a pointer carrying a rider of magnetic material, a pair of magnets forming contacts between which said rider is moved by the pointer, a motor adapted to be energized by the engagement of said rider with a magnet, a pair of pusher arms for separating said rider from the respective magnets, cam means driven by said motor and including a cam track for each of the respective pusher arms, each track including an inactive portion and at least one lobe for holding the associated pusher arm spaced from the path of said pointer, an auxiliary switch actuated by said motor to closed position prior to the separation of the instrument contacts which energized said motor and to open position when one pusher arm is moved to said spaced position by said cam means, a load circuit switch and means actuated by said motor for operating said load circuit switch.

15. A control device as claimed in claim 14, wherein each cam track includes a plurality of adjacent lobes located opposite an extended inactive portion of the other cam track.

16. A control device comprising an instrument having a contact movable between a pair of relatively fixed contacts, a pair of pusher arms for separating said movable contact from the respective fixed contacts, a cam having cam tracks for operating said pusher arms, a motor for driving said cam, a switch, a cam operated by said motor for controlling said switch, a pivoted support adapted to receive a tilting switch, and means actuated by said motor for effecting angular movement of said support between two limiting positions thereof.

17. A control device as claimed in claim 16, wherein the cam tracks of said first cam each include a plurality of adjacent lobes, the group of lobes of one track being opposite a portion of the other track which is free from lobes.

18. A control device as claimed in claim 16, wherein the cam tracks of said first cam each include a plurality of adjacent lobes, the group of lobes of one track being opposite a portion of the other track which is free from lobes, and said second cam has a lobe for each lobe on said cam tracks.

19. In a control device, an instrument including contacts for closing a motor circuit, a motor energized by the closure of said instrument contacts, means actuated by the motor for opening said instrument contacts, means including a switch actuated by said motor for completing an energizing circuit for said motor independently of said instrument contacts, a load circuit switch, and means actuated by said motor for opening and closing said load circuit switch.

20. In a control device, an instrument having a movable contact arm, a relatively fixed contact, a motor having an energizing circuit including said contact arm and contact, pusher means actuated by said motor for breaking an engagement of said contact arm and contact which energizes said motor, means including a switch actuated by said motor completing an auxiliary motor circuit for energizing said motor to actuate the same for a predetermined period after said pusher means breaks the engagement of said contact arm and contact, and a load circuit switch actuated by said motor.

21. In a control device, the combination with an instrument type relay including a pointer movable over a scale, a magnetic rider on said pointer, a magnet adjacent said scale for attracting said rider into engagement therewith when said pointer stands in a predetermined position, said rider and magnet constituting the electrical contacts of said relay, and an index connected to said magnet for indicating on said scale that predetermined position of the pointer at which said magnet exerts a force sufficient to attract said rider to close the said contacts, of a motor having an energizing circuit including said relay contacts, and means actuated by said motor for separating said contacts.

22. In a control device, an instrument type relay including a pointer movable over a scale, a magnetic rider on said pointer and constituting an electrical contact, a magnetized contact adjacent said scale for attracting said rider contact into engagement therewith when said pointer stands in a predetermined position, an index connected to said magnet for indicating on said scale the predetermined position of the pointer at which said magnetized contact exerts a force sufficient to attract said rider to close said contacts, a support for said magnet, means for adjusting said magnet on said support to control the predetermined pointer position which will result in a closure of said contacts, and electrically-operated means energized by a closure of said contacts to separate the same.

23. In a control device, the combination with a measuring instrument including a moving system carrying a pointer, a graduated scale over which said moving system displaces said pointer in accordance with the measured magnitude of the factor which influences said instrument, an index for adjustment along said scale to indicate thereon a critical measured value at which an electrical circuit is to be closed, of a switch adapted to be included in the electrical circuit, the contacts of said switch comprising a magnetic rider on said pointer and a magnetized contact for attracting said magnetic rider, a support upon which said index and magnetized contact are spaced apart by the distance over which said magnetized contact can attract said magnetic rider, and means mounting said support for movement to adjust said index and magnetized contact along said scale.

24. A control device as claimed in claim 23, in combination with means for separating said switch contacts after an engagement of the same.

25. A control device as claimed in claim 23, in combination with means energized by a closure of said switch contacts for separating the same.

26. In a control device, an electrical measuring instrument having a pivoted coil system adapted for movement over a substantial range in accordance with the magnitude of the quantity measured by said instrument, a pointer carried by said moving coil system and cooperated with a scale graduated in terms of the measured quantity, a contact of magnetic material on said pointer, a relatively stationary contact cooperating therewith and comprising a permanent magnet, means supporting said permanent magnet contact for adjustment to a desired position along said scale, and an index carried by said supporting means for indicating that scale value which is the limit of the effective field of magnetic attraction of said permanent magnet contact, and means for separating said contacts after a closure thereof.

27. In a control device, a measuring instrument having a pointer carrying a rider of magnetic material, a scale over which said pointer moves, a magnet cooperating with said rider to form a pair of instrument contacts, an index connected to said magnet for indicating on said scale that predetermined portion of the pointer at which said magnet exerts a force sufficient to attract said rider to close said contacts, and means for separating said contacts upon a closure thereof.

28. A control device as claimed in claim 27, wherein said separating means includes a movable arm carrying said magnet and index.

29. A control device as claimed in claim 27, wherein said separating means includes a movable arm carrying said magnet and index, and means supporting said arm for adjustment along said scale, thereby to control the predetermined pointer position which will result in a closure of said contacts.

30. In a control device, an instrument type relay including a pointer movable over a scale, a magnetic rider on said pointer and constituting an electrical contact, a magnetized contact adjacent said scale for attracting said rider contact into engagement therewith when said pointer stands in a predetermined position, an index connected to said magnet for indicating on said scale the predetermined position of the pointer at which said magnetized contact exerts a force sufficient to attract said rider to close said contacts, a movable support for said magnet, a motor having an energizing circuit including said contacts, and means actuated by said motor to depress said magnet support to separate said contacts.

ANTHONY H. LAMB.